Aug. 18, 1953   C. A. HAWKINS ET AL   2,649,060
SOIL TREATING MACHINE
Filed Nov. 7, 1949   5 Sheets-Sheet 1
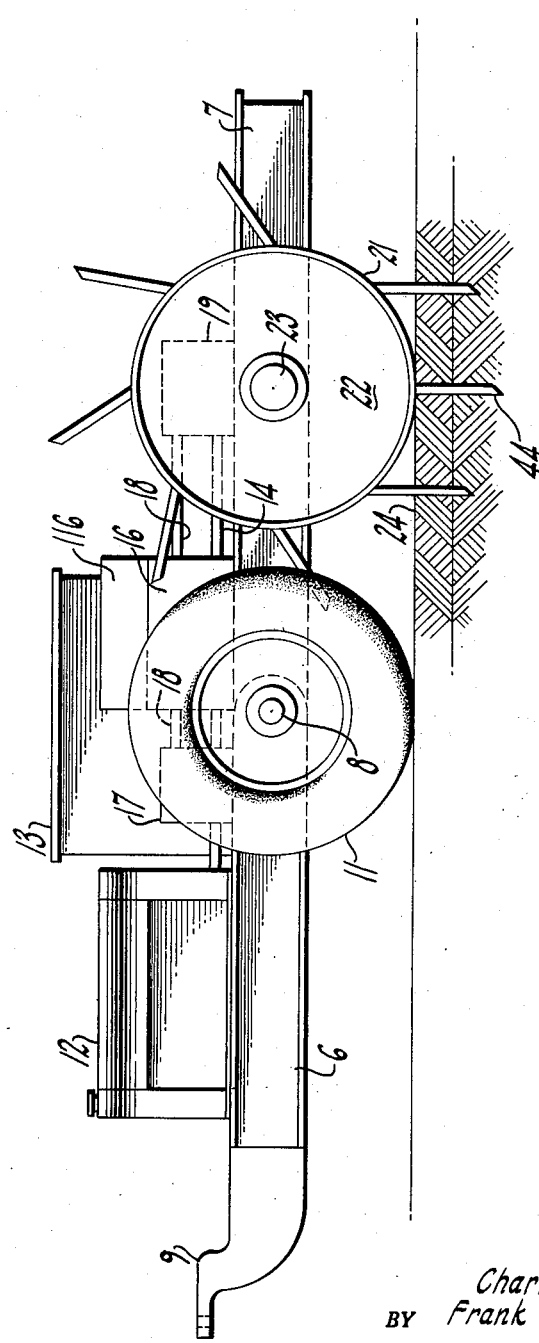
INVENTOR.
Charles A. Hawkins
BY Frank H. Zehrbaugh
ATTORNEY

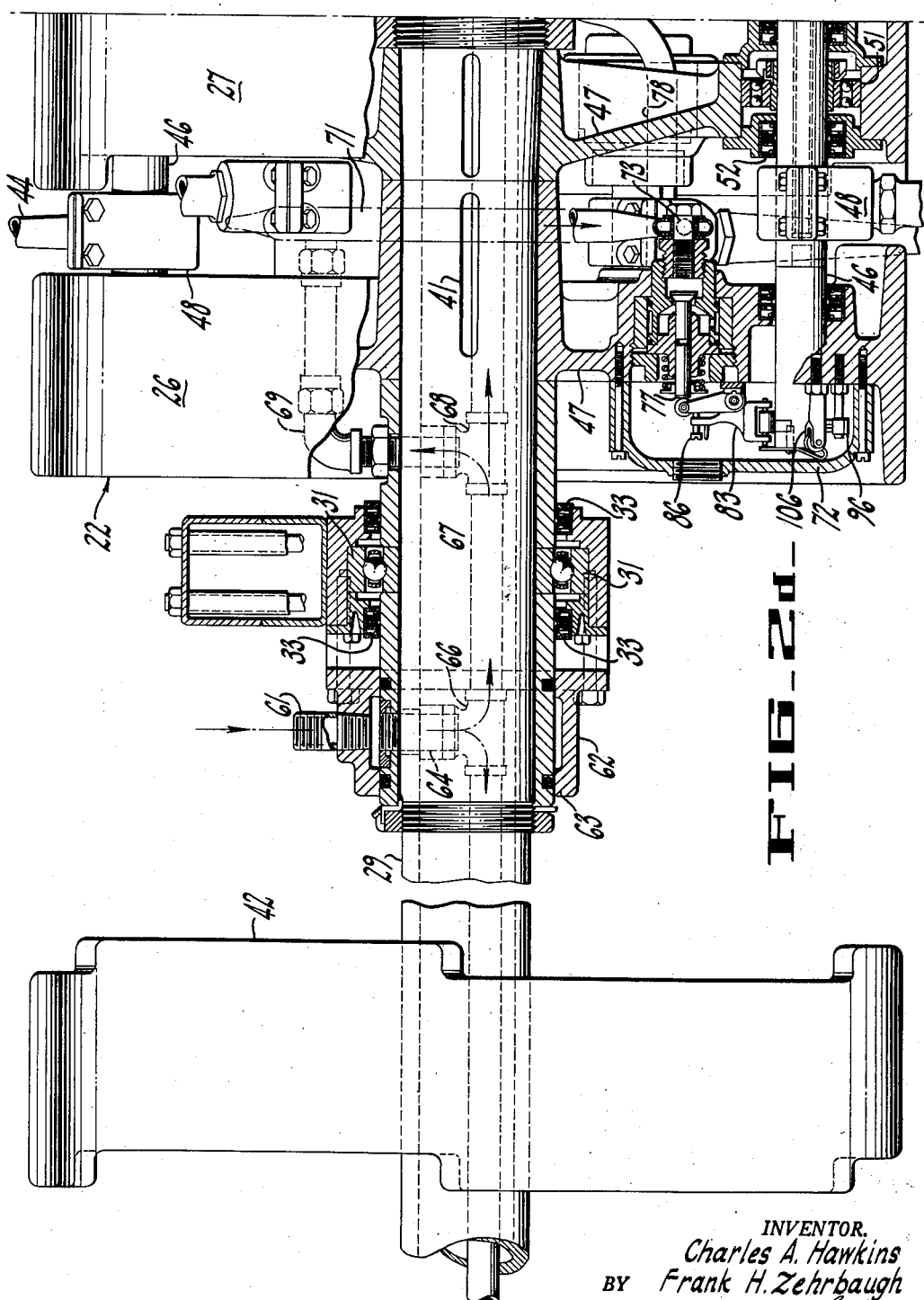

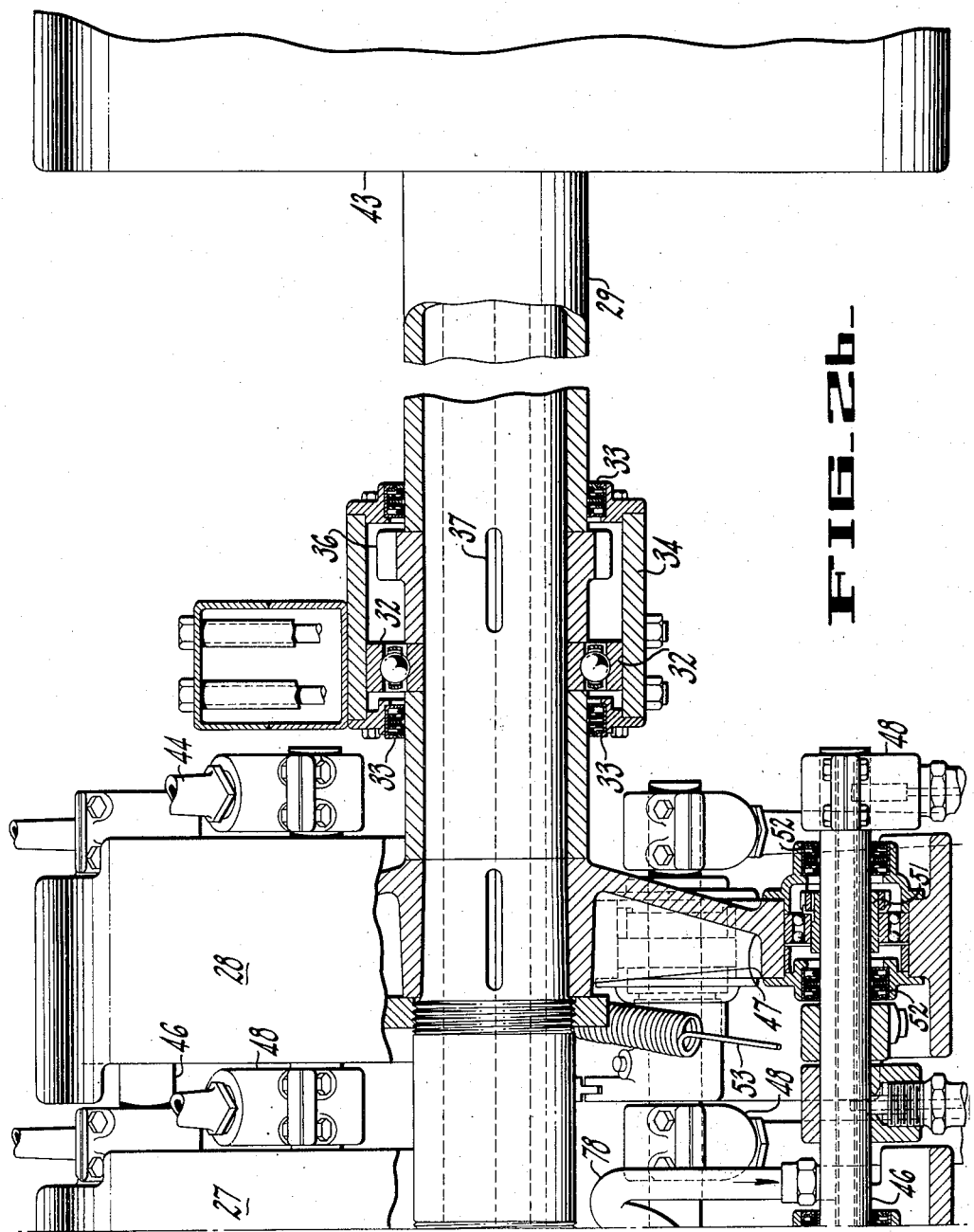

Aug. 18, 1953     C. A. HAWKINS ET AL     2,649,060
SOIL TREATING MACHINE
Filed Nov. 7, 1949     5 Sheets-Sheet 4
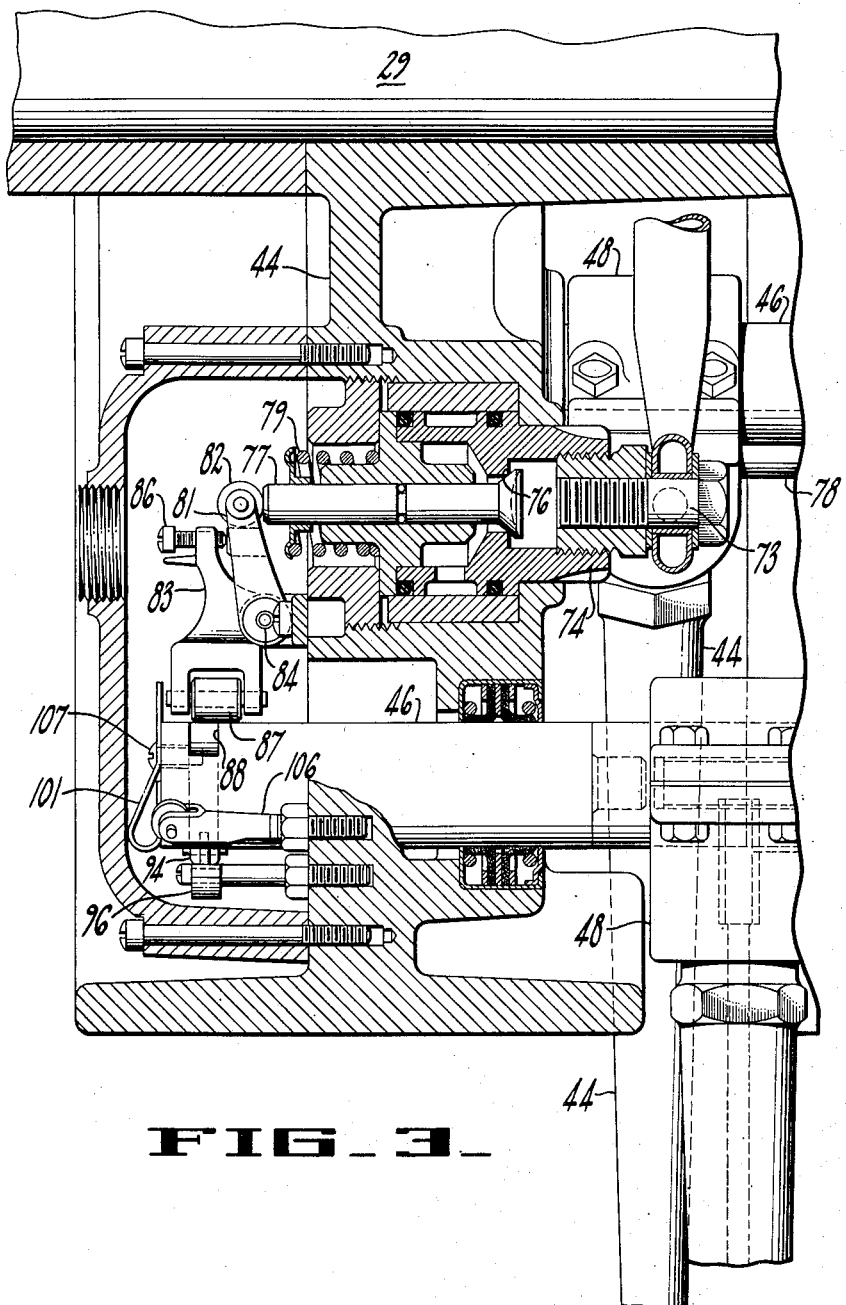
FIG_3_
INVENTOR.
Charles A. Hawkins
BY Frank H. Zehrbaugh
Marcus Lothrop
ATTORNEY

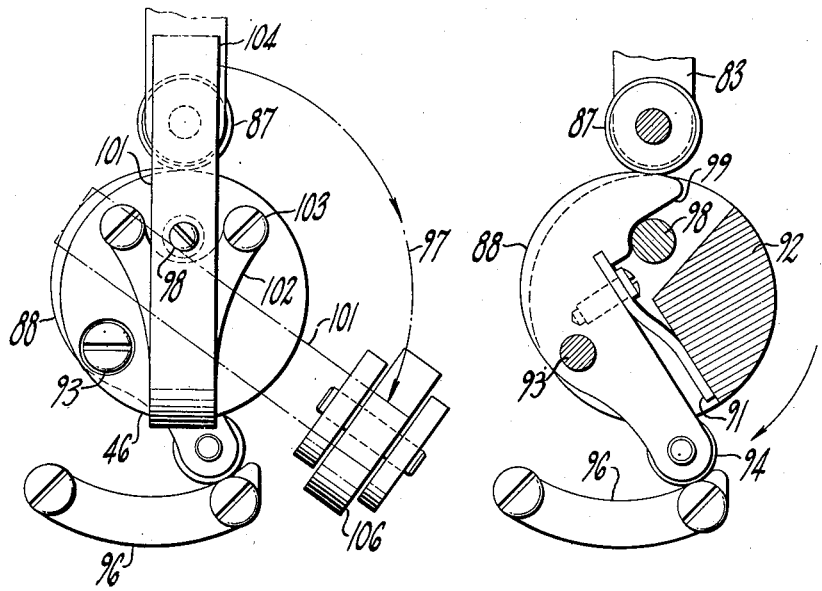
FIG_4_  FIG_5
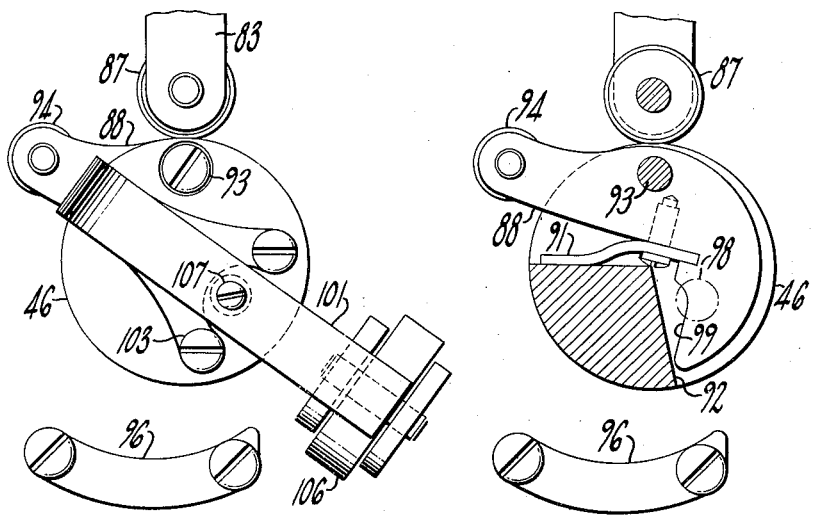
FIG_6_  FIG_7

Patented Aug. 18, 1953

2,649,060

UNITED STATES PATENT OFFICE 2,649,060

SOIL TREATING MACHINE

Charles A. Hawkins and Frank H. Zehrbaugh, Fresno, Calif., assignors to Charles A. Hawkins, Fresno, Calif.; Odelia Comba Hawkins and Matilda B. Anway, coexecutors of said Charles A. Hawkins, deceased Application November 7, 1949, Serial No. 125,948

2 Claims. (Cl. 111—6)

Our invention relates to agricultural machinery and especially to a device for use in improving the condition of the natural soil for agricultural and comparable purposes. The machine is of the general character disclosed in our co-pending application entitled "Soil Treating Devices," filed November 24, 1947, with Serial No. 787,794.

It has long been the general desire to improve the condition of soil in such a manner as to enhance the agricultural yield and to assist in the production of increased yields and of better produce. This endeavor has taken two general directions, the first being to increase the availability of materials naturally in the soil and to add other materials of beneficial character to the natural soil and the second has been to destroy or to immobilize or to counteract harmful influences in the soil such as bacteria, comparable organisms and deleterious effects in general. Sometimes these two general aims can be attained in one soil treatment but sometimes it is necessary to treat the soil separately and individually for various phases of these two main purposes.

It is therefore an object of our invention to provide an improved soil treating machine.

Another object of our invention is to provide a soil treating machine which is readily utilized in the customary type of agricultural installation such as in orchards, fields, vineyards and the like.

Another object of our invention is to provide a soil treating machine which is readily utilizable by a farmer or rancher in connection with equipment which he already or customarily owns.

A still further object of the invention is to provide a soil treating machine of a sufficiently economical nature so as to render its use practical by the usual farmer or rancher.

Another object of our invention is to provide a soil treating machine which can readily be repaired or serviced in the usual fashion of agricultural machinery.

Another object of our invention is to provide a soil treating machine which, when used with soil additive material, is frugal in the distribution of such material yet effectuates a uniform and controlled coverage.

Another object of the invention is to provide, in a device comparable to that in our co-pending application, a means for regulating the valve opening period so as to distribute additive material over more or less of the ground puncture made by the penetrating pins.

Other objects together with the foregoing are attained in the embodiment of the invention described in the accompanying description and illustrated in the accompanying drawings in which Figure 1 is a side elevation partly diagrammatic, of a soil treating machine constructed in accordance with our invention.

Figure 2a is in part an elevation of a portion of a drum structure utilized in connection with our soil treating machine and in part is a cross section on a vertical axial plane of part of the drum structure, certain portions of the mechanism being omitted to improve the clarity of disclosure and certain parts being omitted or broken away to reduce the size of the figure.

Figure 2b is a view comparable to Figure 2a and constitutes a continuation thereof at the point of the dot-dash line in Figures 2a and 2b.

Figure 3 is a cross section to an enlarged scale through a valve mechanism utilized in connection with a drum of our soil treating machine.

Figure 4 is an end elevation in one operating position of some of the valve mechanism shown in Figure 3, many of the associated parts being omitted for clarity in disclosure.

Figure 5 is a cross section of some of the mechanism shown in Figures 3 and 4 and in the position of Figure 4, the plane of section being indicated by the line 5—5 of Figure 3.

Figure 6 is a view similar to Figure 4 but showing the parts in another operating position.

Figure 7 is a view in cross section comparable to Figure 5 but showing the same parts in the position of Figure 6.

The soil treating machine of our invention can readily be incorporated in a number of different ways and is subject to numerous variations, within the scope of the claims, which are suggested or indicated by the particular service conditions and the operational environment of the mechanism, it has successfully been embodied in the form illustrated. This structure is for the most part quite similar to that shown in our above mentioned co-pending application to which reference should be had for detailed description and disclosure of many of the features of the machine not germane to the present application.

In general our soil treating machine includes an articulated frame having a forward portion 6 and a rearward portion 7 connected for relative motion about a hinge point 8. The frame portion 6 is designed to be connected by a hitch 9 to any suitable draft vehicle, for example, a tractor, and is additionally supported by ground engaging wheels 11 disposed at either side of the frame portion 6.

Suitably mounted on the frame portion 6 is an engine 12 or other appropriate source of power for operating the various instrumentalities requiring energy. Likewise mounted on the forward portion of the frame 6 is a tank 13 designed to receive any additive material such as fertilizer or sterilizing agents, and preferably such materials or additives are maintained in the tank in a liquid vehicle form. The interior of the tank, and, in fact, all parts that are contacted by the liquid are preferably coated to prevent corrosion or, are made of stainless steel for the same reason.

The liquid is readily handled and transferred by means of a fluid line 14 extending from the tank to the rear portion 7 of the frame with suitable flexible connections and with an appropriate pumping or transferring structure 16. Also mounted on the forward portion 6 of the frame is a driving unit 17, for example a hydraulic pump, connected through a transfer line 18 to a hydraulic motor 19 disposed on the rearward portion 7 of the frame to drive a soil treating mechanism, generally designated 21, journalled on the frame. The hydraulic pump 17 and the hydraulic motor 19 and their attendant mechanisms serve as a convenient means for rotating the soil treating mechanism 21.

The treating mechanism 21 comprises a number of quite similar units, as especially disclosed in our co-pending application and in general includes a number of drums 22 disposed to rotate about an axis 23 on the rear frame portion 7. These drums are appropriately driven by the hydraulic motor 19 so that the drums 22 revolve in the direction of advance of the unit but at a faster or slower rate depending upon the regulation of the hydraulic motor. Under some conditions the drums are turned at exactly the rate of advance so that there is no substantial slippage between the periphery of the drums 22 and the surface of the ground 24 on which the mechanism operates.

Since the drums 22 are preferably several in number for ease in maneuverability and manufacture and since the drums are substantially all alike, a description and an illustration of one of them applies equally to the others.

As especially shown in Figures 2a and 2b, each of the drums 22 is comprised of a number of somewhat similar drum units 26, 27 and 28, respectively. The description of each of the drum units is intended to apply to the others as well except where special features are mentioned. The drum units 26, 27 and 28 are mounted coincidentally with the axis 23 on a tubular axle shaft 29 suitably carried in bearings 31 and 32 mounted on the side members of the frame 7 and appropriately protected by suitable seals 33 to exclude the entry of foreign materials. The bearing 32 is provided with an enlarged housing 34 in which a gear 36 is disposed for connection by a key 37 to the shaft 29 and also for driving connection with the hydraulic motor 19 arranged on the frame 7 and connected by the lines 18 to the hydraulic pump 17.

The effect of operation of the motor structure is to rotate the shaft 29 and since the individual drum units 26, 27 and 28 are all connected to the shaft by comparable keys 41, all of these units turn together under the influence of the motor. In addition, a similar left hand outboard unit 42 comprised of three drum units (not individually shown) and a right hand outboard unit 43 similarly constituted are also driven simultaneously by the motor 19 since they are comparably fastened to the shaft 29.

Each of the drum units, such as the unit 28, is a generally circular cylindrical structure having a staggered margin so that a number of ground penetrating pins 44 can be appropriately accommodated in sets. Each set of these pins 44 is mounted on a cross tube 46 extending through the web portion 47 of all of the drum units 26, 27 and 28. The distance between the units is such that the tube 46 accommodates the pin hubs 48 for free rotary oscillation in unison with the tube. The alternate mounting tubes 46 are offset so that the swing or range of the pins as they oscillate is relatively great and can be accomplished without interference between adjacent pins. The hub 48 is hollow and communicates with the hollow interior of the tube 46. The ground penetrating pin 44 itself is hollow and has any appropriate contour so long as at least the outermost end thereof is perforate and communicates through the hollow pin with the interior of the tube 46, this being the means for transmitting to the soil any additive material conveyed to the interior of the mounting tube 46. Each of the tubes is carried by anti-friction bearings 51 located in the webs 47 and is protected by a pair of seals 52 to keep out any extraneous matter and to confine the lubricant.

The mounting and positioning of the pins 44 with respect to the earth 24 as the device is advanced thereover is such that the leading pins engage the earth and penetrate it as the drums 21 roll over them. Since the pins are more or less firmly engaged with the earth and since they are mounted with the tubes 46 for pivotal movement, a relative swinging movement occurs between the ground engaging pins and the drums 21 during the lower part of the pin motion. As the drum continues to advance, the relative swinging movement continues to a maximum as the pin is withdrawn from the earth. Finally as the pin is free or nearly free of the earth, it is restored to its original position relative to the drum 21 by means of a coil spring 53. One end of the spring is connected to any suitable, relatively stationary anchor on a drum unit and the other end is appropriately connected to the tube 46. Energy is stored in the spring as the leading pins enter the ground and swing with respect to the drum unit and such energy is utilized to restore the pins to their initial position as they are finally withdrawn from the earth. The mechanical motion of the pins in entering and leaving the ground is of value as a piercing or perforating and as a mixing and cultivating means.

When additive material is introduced through through the hollow tubes and pins a further benefit is obtained. Preferably the additive material is applied through the hollow members not in a continuous fashion but rather intermittently and only when the hollow pins are near or in the ground. For that reason I provide a valving mechanism to control the fluid flow.

Fluid from the tank 13 is carried by the pump or circulating device 16 through the line 18 leading eventually to a coupling 61 entering into a housing 62 encompassing the shaft 29 and sealed from the atmosphere by suitable rings 63. The liquid material is led into the interior of the shaft by a pipe 64 screwed into the shaft and connected by an enclosed T 66 with a transverse feed line 67 extending throughout most of the length of the hollow shaft 29. Adjacent appropriate ones of the drum units, for example the unit 26, the line 67 is again provided with a T 68 leading to a branch pipe 69 screwed into the shaft and extending to a distributing ring 71. The various pipes such as 64 and 69 support the T's 66 and 68 and the line 67. The ring 71 is coaxial with the axle shaft 29 and passes adjacent the various cross tubes 46. Since each of the cross tubes 46 is internally connected with a group or set of three pins 44, we provide a valve structure 72 for each of the cross tubes and thereby individually control the flow to each set of three pins.

Fluid passing from the ring manifold 71 travels through a hollow, perforated bolt 73 into the interior of a fitting 74 including a valve seat 76. Flow through this seat is governed by a poppet valve 77, there being a flexible conduit 78 (Figure 2a) for carrying fluid that has passed the valve seat into the interior of the appropriate one of the shafts 46 (Figure 2b). By properly actuating the valve 77, flow to the connected individual set of pins 44 can be controlled.

The poppet valve is normally held closed or in sealed position under the urgency of a coil spring 79 and is opened by a pivotal actuating lever 81 carrying a roller 82 at its outer end. The roller lever 81 is in turn adjustably actuated by a follower 83 appropriately journalled on a cross pin 84 and provided with a screw 86 for establishing the amount of lost motion between the lever 83 and the lever 81 and thus establishing the timing, the duration and the amount of valve opening permitted.

At its lower end, the lever 83 carries a follower roller 87 adapted to roll on the periphery of tube 46 in the path of a cam 88 swingably mounted on the end portion of tube 46. As the pins 44 on the tube 46 enter the earth and withdraw from it, they partake of a swinging movement about the axis of the shaft 46 with respect to the remainder of the drum on which the valving and camming mechanism is mounted. Advantage is taken of this relative swinging movement to actuate the cam 88. As the swinging occurs when the pin is in the ground and the drum is advancing, the cam 88 (Figure 4) advances under the roller 87 and consequently lifts the roller to open the valve 77 and then drops the roller to permit the valve to close again. This permits fluid to be forced out of the hollow pins 44 while they are in the ground.

As the pins withdraw from the ground, the effect of the spring 53 is to return them to their original positions ready for a subsequent cycle. It is not desired that the valve 77 be opened during this return motion and for that reason we provide means for withdrawing the cam 88 to a position within the periphery of tube 46 without, during its return, actuating or lifting the roller 87.

Except for other restraints, the cam 88 is normally held in a withdrawn position under the urgency of a leaf spring 91 secured to the cam 88 and also abutting a solid portion 92 of the tube 46. The urgency of the spring 91 is to roate the cam 88 about its mounting pivot 93 into a withdrawn position (Figure 7). However, means are provided for moving the cam into an active position outwardly of the periphery of tube 46. As the tube 46 swings on a return stroke the cam 88 is moved against the urgency of the spring 91 by reason of contact between a roller 94 on the cam structure and a cam track 96 secured to the drum web 47.

As the roller 94 returns with the cam from a preceding cycle in a direction opposite to the arrow 97 in Figure 4, it rides up upon the track 96 so that the roller 94 is moved inwardly relative to tube 46 and the cam 88 is moved outwardly, and the spring 91 is compressed. This condition would not be maintained except for the fact that an axially movable pin 98 extends underneath a lug 99 to latch the cam in its outward position. The pin 98 is itself pressed axially by a looped spring 101 having its split end 102 secured by suitable fastenings 103 to the end of tube 46 and its end 104 overlying a trip 106, the pin 98 being secured to said spring by a screw 107 inwardly of the end 104.

After the cam 88 is moved to its outward position, the pin 98 holds it there while the drum advances and the pin 44 swings with respect to the drum in the advancing direction, the cam 88 then rides under the roller 87 to lift the latter and open the valve 77. The end 104 of the spring then overrides the trip 106 in the form of a roller. This roller is adjustably mounted on one end of the adjacent drum unit 26 and serves to move the spring 101 to withdraw the pin 98 from abutment with the lug extension 99 of the cam. When pin 98 is withdrawn, the prestressed spring 91 is then effective to move the cam 88 into its withdrawn position. The cam consequently is in withdrawn position as it returns under the roller 87 so that the valve is not opened as the pin swings under the influence of the spring 53 after it has been withdrawn from the ground.

Toward the end of the return movement of the cam 88, the roller 94 again engages the track 96, the cam 88 is moved to its outward position and the spring 101 impels the pin 98 to catch again under the lug 99 so that the parts are reconditioned for a subsequent cycle. By virtue of this mechanism, therefore, each group of three pins 44 in each of the drum units is actuated at an appropriate time to permit the introduction of an additive to the soil under pressure as the pins 44 are buried in it but to preclude the discharge of such material after the pins have been withdrawn.

In accordance with our invention we provide not only means for furnishing liquid additive to the soil in the described fashion, but also provide means for imparting an additional or alternative function to the pins 44. We have found it desirable to subject the pins 44 while they are in the ground to a vibratory motion so that the vibrational energy is transferred from the pins to the ground as an "additive" thereto, such vibration being considered quite beneficial. The vibratory motion is preferably of a high frequency; for example, of an ultrasonic frequency. This type of vibration is attained in one fashion by interrupting or modulating the flow of pressure fluid passing from the pump 16 through the line 14 into the various pins 44. The modulation is the result of varying the pressure of the liquid over a wide range and at a very high frequency. Such variation is accomplished by an oscillating wall such as a diaphragm or piston transmitting its effect through the liquid to the pins to cause them to vibrate, as well, this vibration being transmitted to the soil and its contents.

Additionally as indicated by the diagrammatic showing in Figure 1, we provide a separate, supersonic generator 116 either in connection with the modulated fluid flow described or as a separately operated device for transmitting its energy at a supersonic frequency to various parts of the mechanism and particularly to the pins 44. The generator 116 of supersonic waves can be situated in any appropriate part of the mechanism and is indicated diagrammatically for reference. In addition, the mechanism 116 can dissipate energy not only at supersonic frequencies but also at other frequencies; for example, those of radio waves.

As another alternative, the additive liquid itself, if it is or can be made a conductor, itself can be utilized in connection with associated metal and insulating parts of the machine as a separate electrical conductor so that one portion of an electrical circuit to the earth can be provided by any metal part of the machine touching the ground whereas the other portion of such an electrical circuit can be provided through some or all the pins or through the conducting liquid ejected from the pins. In this way, the soil is subjected to another "additive" in the form of an electrical field either separately or in connection with the addition of material to it. All of these variations are readily effectuated either through the liquid medium being added or to the soil or directly by the pins 44 while they are in engagement with the soil.

We claim:

1. A soil treating machine comprising, a frame adapted to be advanced over the ground, a drum journalled on said frame for rolling contact with the ground, a pin projecting from the periphery of said drum and pivotally mounted thereon for ground penetration and withdrawal during rolling of said drum and for pivotal movement relative to said drum from a first to a second position, means normally urging said pin to said first position but permitting movement to said second position during said ground penetration and withdrawal, conduit means on said drum for conducting a soil additive to a ground penetrating portion of said pin, a valve in said conduit and mounted directly on said drum, valve control means operated by said movement of said pin from said first to said second position to open and then close said valve, said control means including an element movable with said pin along a predetermined path of movement and a movable valve opening member in said path of movement of said element, said valve control means further including mechanism operable by movement of said pin into said second position for moving said element relative to said pin to move therewith along a different path of movement so that return movement of said pin from said second to said first position does not open said valve.

2. A soil treating machine as defined in claim 1, wherein said element comprises a cam and said member comprises a cam follower, said cam being movable generally radially of the pivot axis for said pin, said mechanism including a spring normally urging said cam radially inwardly to a position clear of said cam follower and means for holding said cam outwardly in follower-engaging position.

CHARLES A. HAWKINS.
FRANK H. ZEHRBAUGH.

References Cited in the file of this patent

UNITED STATES PATENTS

| Number | Name | Date |
|---|---|---|
| 396,891 | Peter | Jan. 29, 1889 |
| 431,288 | Shanks | July 1, 1890 |
| 596,997 | Haley | Jan. 11, 1898 |
| 859,536 | Albert | July 9, 1907 |
| 1,171,277 | Thayer | Feb. 8, 1916 |
| 1,871,529 | Karshner | Aug. 16, 1932 |
| 2,036,416 | Krueger | Apr. 7, 1936 |
| 2,429,412 | Keller | Oct. 21, 1947 |

FOREIGN PATENTS

| Number | Country | Date |
|---|---|---|
| 225,866 | Germany | Sept. 21, 1910 |
| 363,357 | Italy | Oct. 3, 1938 |
| 651,812 | Germany | Oct. 20, 1937 |
| 867,503 | France | Aug. 4, 1941 |